Jan. 14, 1969   W. E. LAUZON   3,421,226

COMBINATION LAYOUT AND SPOTTING APPARATUS

Filed Oct. 10, 1966   Sheet 1 of 4

INVENTOR.
WILLIAM E. LAUZON

BY Kenwood Ross
ATTORNEY.

INVENTOR.
WILLIAM E. LAUZON
BY Kenwood Ross
ATTORNEY.

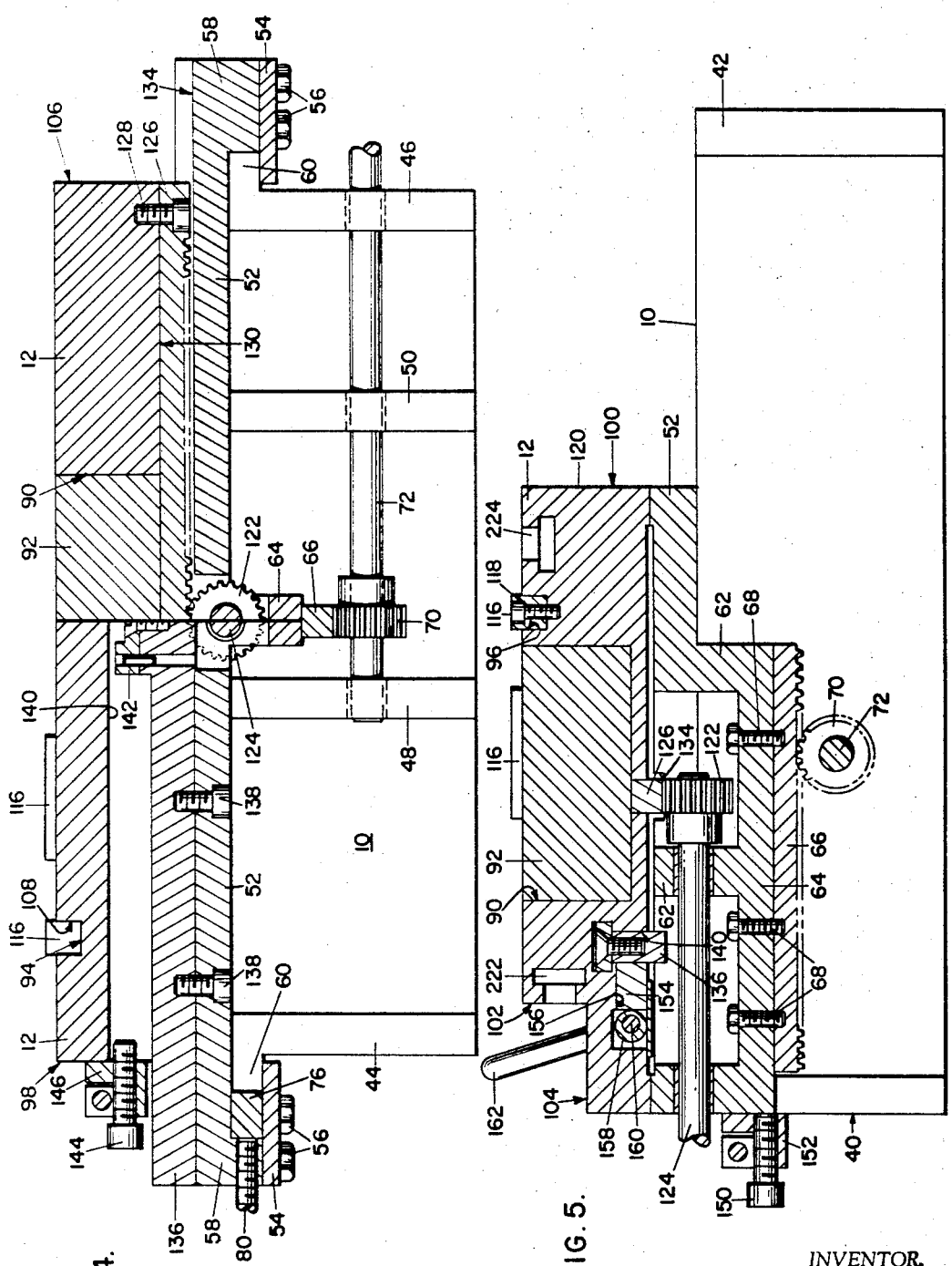

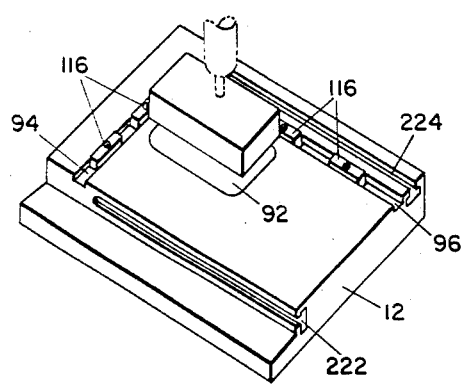
FIG. 6.
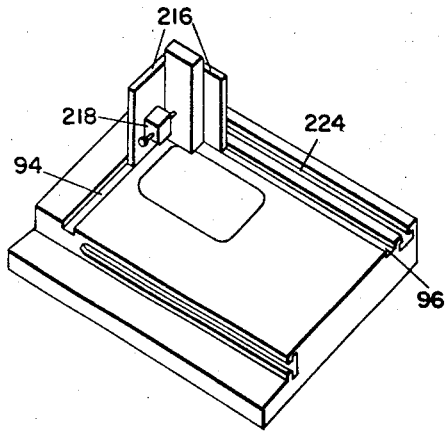
FIG. 7.
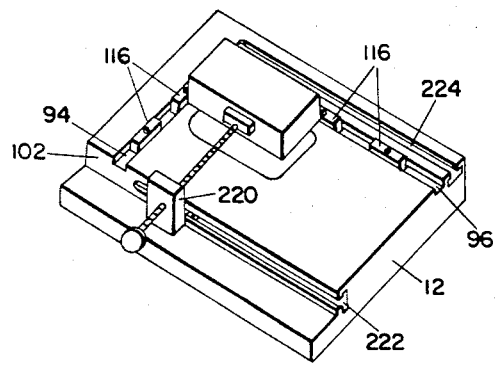
FIG. 8.
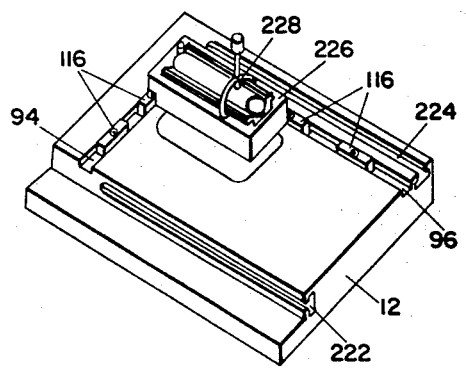
FIG. 9.
FIG. 10.
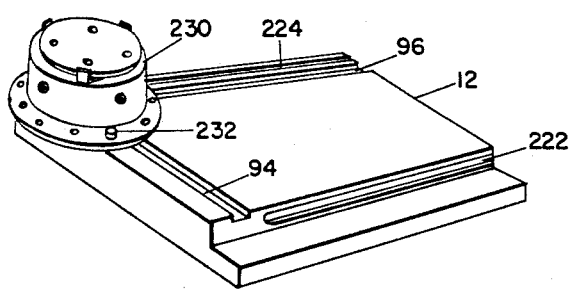

United States Patent Office 3,421,226
Patented Jan. 14, 1969

3,421,226
COMBINATION LAYOUT AND SPOTTING APPARATUS
William E. Lauzon, 107 Fillmore St.,
Bennington, Vt. 05201
Filed Oct. 10, 1966, Ser. No. 585,561
U.S. Cl. 33—189                                    5 Claims
Int. Cl. G01b 5/14; G01b 7/14; G01b 11/14

ABSTRACT OF THE DISCLOSURE

A working holding table which is mounted for mutually perpendicular horizontal movements relative to a fixed base and a drill press spindle. The table has a magnetic-chuck mounting and keys seated in grooves for positioning a corner of the work at the zero part of the table. Indicators are also provided for indicating movement of the table relative to the zero point.

---

The present invention relates to a layout, spotting and measuring mechanism and more particularly to a work holding and positioning means for performing the functions of layout and/or spotting and/or measuring repeatedly and in multiple.

The term "layout," as used in reference to the apparatus of the invention, is defined as the locating and drawing of lines on a workpiece, which lines are to be used as guides for the subsequent machining of the workpiece.

The term "spotting," as used in reference to the apparatus of the invention, is defined as the operations performed on a workpiece preliminary to drilling or like operations, namely, locating the hole location decimally and marking the center and starting the hole with a center drill (a short, non-flexing 60° drill-like tool).

The term "measuring," as used in reference to the apparatus of the invention, is defined as determining the distance of a hole or edge or other feature of a workpiece from a fixed linear "zero" point.

The locating and marking of centers on a workpiece for subsequent drilling or like operations has long been a tedious and time consuming task performed primarily with hand tools. Also, the results obtained, in the way of accuracy of center locations, has left much to be desired.

Accordingly, it is a primary object of the invention to provide apparatus for quickly, easily and accurately locating and marking centers in a workpiece for subsequent drilling or like operations.

Another object is to provide apparatus for locating and scribing lines on a workpiece, which lines are to be used as a guide in subsequent machining operations, such as milling, shaping, grinding and the like.

Another object is to provide apparatus which, once a center has been located thereon for one workpiece, requires no further adjustment for other workpieces of like dimensions, thereby obviating the necessity of relocating the center for each such workpiece.

As another feature worthy of particular notice, the apparatus envisions laying out and/or spotting centers in workpieces of a wide variety of shapes, sizes and characteristics.

Still another object is to provide apparatus for determining the distance of a part feature, such as a hole or an edge of a workpiece, from the linear "zero" point of the apparatus (i.e., "measuring").

Broadly speaking, the invention comprises a work holding table mounted for mutually perpendicular horizontal movements relative to a fixed base and drill press spindle, means being provided for locating the linear zero point of the table, and consequently of the workpiece, with respect to the drill press spindle, and means being also provided for locking the table and workpiece in various positions of adjustment.

Further objects will be apparent to those skilled in the art after a reading of the appended detailed specification and claims when considered in conjunction with the annexed drawings, wherein:

FIG. 4 is a cross sectional view taken on line 4—4 of FIG. 3;

FIG. 5 is a cross sectional view taken on line 5—5 of FIG. 3; and

FIGS. 6–10 are somewhat diagrammatic, abbreviated, perspective views of the work holding table of the apparatus showing fixtures employed to hold various types of workpieces for layout and/or spotting and/or measuring.

With detailed reference to the drawings, the apparatus of the invention is employed: (1) to accurately and quickly locate centers on workpieces of various sizes, shapes and characteristics for subsequent operations such as drilling, boring and the like (i.e., "spotting"); (2) to locate and scribe lines on a workpiece, which lines are to be used as a guide for subsequent machining of the workpiece (i.e., "laying out"); and (3) to determine the distance of a part feature, such as a hole or an edge, from the linear "zero" point of the apparatus (i.e., "measuring").

Figure 1:
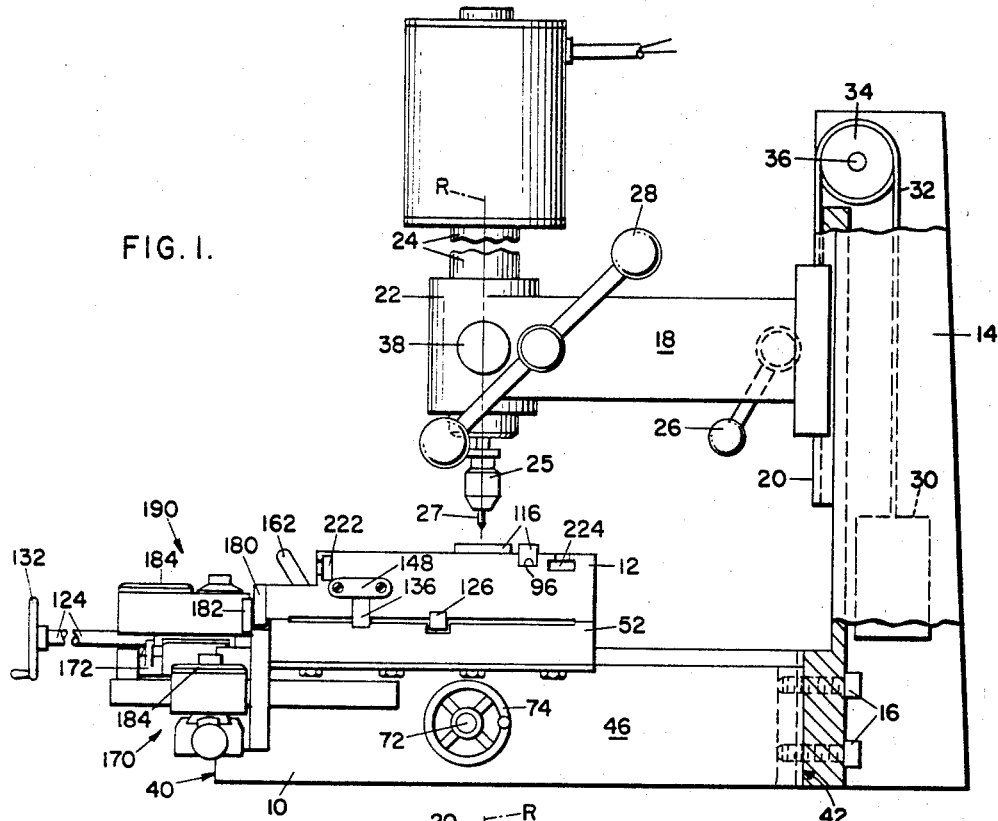
FIG. 1 is a side elevational view of a combination layout, spotting and measuring apparatus embodying a preferred form of the invention, with parts broken away and other parts shown in section for purposes of clarity.
Figure 2:
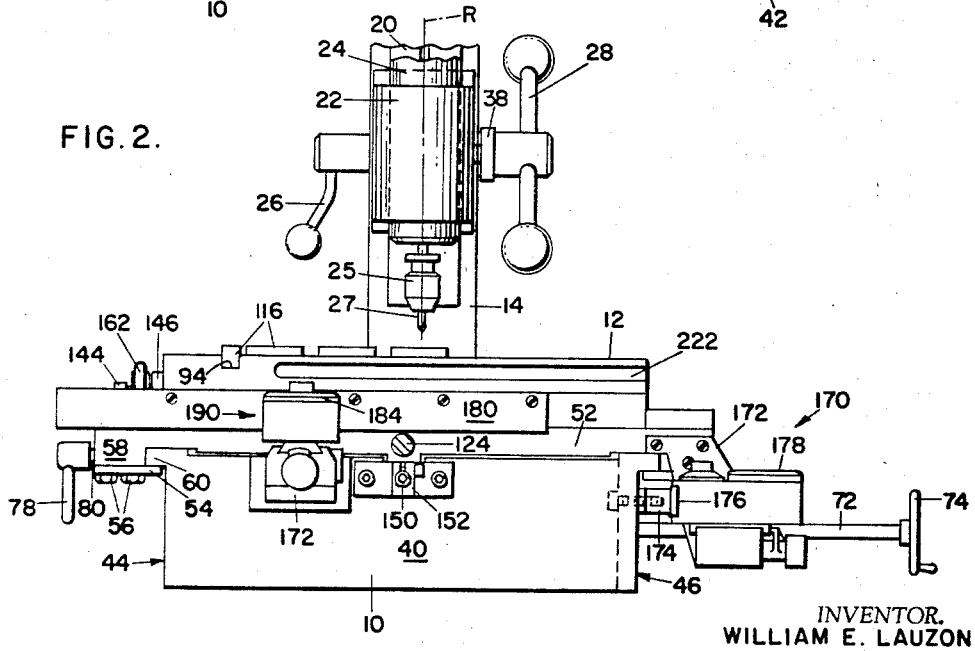
FIG. 2 is a front elevational view of the apparatus of FIG. 1.

A preferred form of the invention is shown in FIGS. 1 and 2, wherein a base 10 mounts on its upper planar surface a table 12 for holding a workpiece, not shown, to be spotted or laid out or measured, the base additionally having the lower end of a spindle-carrying column 14 fixed to its rearward wall as by bolting 16.

Column 14 extends vertically-upwardly from base 10 and has an arm 18 projecting horizontally-outwardly therefrom in spaced parallel relation to table 12, said arm being slidably engageable at its rearward end with a slideway 20 on the column forward face and being provided at its opposite or forward end with a collar 22 which carries a motorized spindle 24 with an axis of rotation R, the spindle being of any commercially available type adapted by means of a collet, drill chuck or similar apparatus 25 to hold, in depending manner, a scribe, center drill, or like tool 27, the spindle and its associated parts being disposed normal to the plane of table 12.

Arm 18 may be locked in positions of vertical adjustment relative to column 14 by a lock handle 26 and spindle 24 may be raised or lowered relative to the collar by a spindle handle 28, the spindle and arm assembly being counterbalanced by a counter weight 30 provided at the free end of a cord 32 entrained around a pulley 34 mounted on a shaft 36 journalled in the column, the cord being fixed at its opposite end to arm 18.

A spindle lock 38 is provided for locking the spindle in various positions of vertical adjustment relative to collar 22 of arm 18.

Since the spindle, arm, column and related parts are conventional, further discussion thereof will not be had.

Base 10, which is substantially rectangular in plan, comprises spaced, parallel and upstanding forward and rearward walls 40 and 42 interconnected at their ends by spaced, parallel and upstanding end walls 44 and 46 and further interconnected intermediate their ends by spaced parallel webs 48 and 50. The base is adapted to rest on a table, stand, workbench or other suitable supporting surface.

A substantially rectangular saddle 52 is mounted on the upper surface of the base for movement in a horizontal plane transversely, or from front to rear and return, relative to the base.

Upward displacement of the saddle is precluded by means of retainer plates 54, best seen in FIG. 4, fixed by bolts 56 to depending flanges 58 provided on the side walls of the saddle, which retainer plates underlie and make sliding contact with outwardly-extending flanges 60 provided at the upper ends of the end walls 44 and 46 of the base. The contact between the retainer plates and flanges 60 is not such as to preclude transverse sliding movement of the saddle relative to the base.

The saddle is provided, on its front-to-rear central axis, with spaced depending bosses 62 interconnected at their lower ends by a connecting web 64 which serves as a carrier for a rack 66 fixed thereto by bolts 68.

Rack 66 meshes with a gear 70 fixed to a horizontally and longitudinally-extending shaft 72 journalled in end wall 46 and webs 48 and 50 of base 10, the shaft having a free end extending outwardly from said end wall and having a hand-wheel 74 fixed thereto.

Rotation of hand-wheel 74 causes appropriate forward or reverse movement of the saddle relative to the base.

A saddle locking bar 76 is disposed between one side flange 58 of the saddle and the adjacent flange 60 of end wall 44 of the base for locking the saddle relative to the base in the desired positions of front-to-rear adjustment. The saddle locking bar may be moved into and out of tight bearing engagement with flange 60 of the base by rotation of a handle 78 to bring the end of a set screw 80 threaded in flange 58 of the saddle into and out of engagement with the saddle locking bar, thereby to preclude or to permit movement of the saddle relative to the base.

Table 12 is generally coextensive with and is mounted on the upper surface of the saddle for movement in a horizontal plane longitudinally, or from side to side, relative to the saddle.

A recess 90 provided in the upper surface of table 12 carries a magnetic chuck 92 wherefore the table will firmly hold magnetic metal stock thereon without the necessity of clamps or other holding means.

A pair of mutually perpendicular grooves 94 and 96 are also provided in the upper surface of the table; groove 94 being disposed in spaced parallel relation to a side wall 98 of the table and groove 96 being disposed in spaced parallel relation to a rear wall 100 of the table whereby the grooves each border a side of the magnetic chuck.

Groove 94 extends inwardly from a front wall 102 formed by stepping the upper surface of the table as at 104 at its forward edge and terminates at a point adjacent a corner of the magnetic chuck.

Groove 96 extends inwardly from a side wall 106 of the table and also terminates at a point adjacent the aforementioned corner of the magnetic chuck.

Were the inner walls 108 and 110 of the grooves 94 and 96, respectively, to be continued as indicated by the imaginary lines X and Y in FIG. 3 to a point of intersection as indicated by Z, that point of intersection would represent the linear zero point of the table, further to be defined hereinafter.

Zero point Z is the center point for an annular opening 112 which extends downwardly from the upper surface of the table and has a bushing 114 sleeved therein. Opening 112 is designed to accept the shaft of a universal chuck for purposes to appear.

Zero point Z also represents the point at which a corner edge of a workpiece will lie when two of its side edges are brought into registry with the inner walls 108 and 110 of the grooves 94 and 96.

To facilitate such registration, keys 116, which extend upwardly of the plane of table 12, are disposed in the grooves 94 and 96 and are fixed in the grooves by bolts 118 which extend downwardly therethrough and are threaded at their lower ends in tapped openings 120 provided in the base wall of each groove.

Since the keys extend above the plane of the table top, the side edges of the workpiece may simply be butted thereagainst to place the corner edge of the workpiece at zero point Z.

Side to side longitudinal movement of the table relative to the saddle is effected by a gear 122 fixed to the inner end of a horizontally-disposed shaft 124 journalled in the bosses 62 depending from the saddle, gear 122 meshing with a rack 126 fixed by bolts 128 in a groove 130 provided in the lower surface of the table, the rack being disposed on the longitudinal central axis of the table.

Rotation of gear 122 is effected by hand-wheel 132 fixed to the outer end of shaft 124.

Rack 126 depends from the lower surface of the table and is slideable along and relative to a longitudinally-extending groove 134 provided in the upper surface of the saddle and extending the full width of the saddle from one side wall thereof to the other.

A key 136 fixed in a groove in the upper surface of saddle 52 by bolts 138 and extending upwardly therefrom in spaced parallel relation to groove 134 is receivable in a keyway 140 provided in the lower surface of the table, whereby the latter may be guided in its longitudinal side to side movements relative to the saddle.

Figure 3:
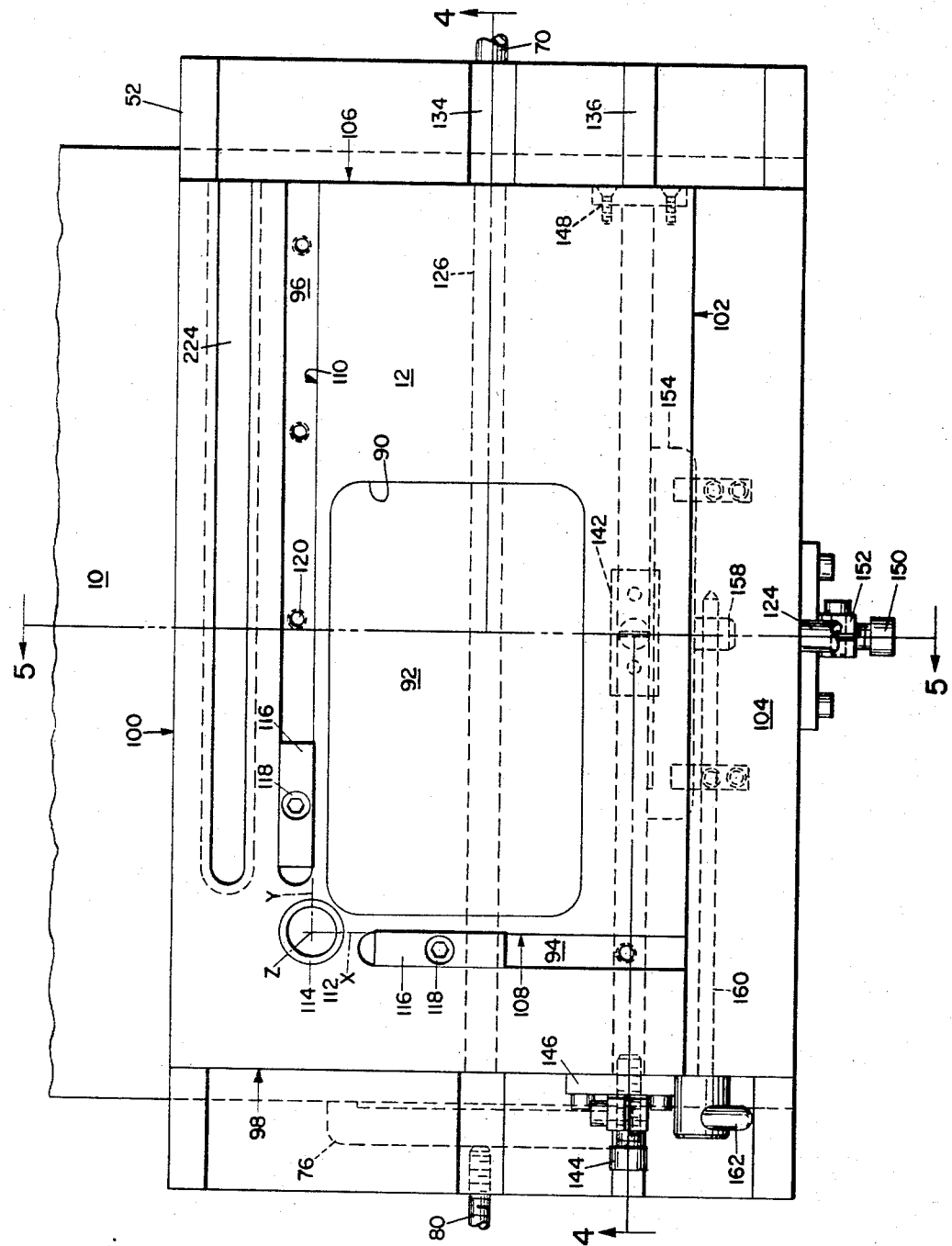
FIG. 3 is an enlarged, fragmentary, top plan view of the apparatus of FIG. 1, with parts omitted for purposes of clarity.

An upstanding cap 142 fixed centrally of the length of key 136, when abutted by a stop screw 144 threaded in an adjustable table stop 146 fixed to the forward face of the table, limits the range of movement of the table relative to the saddle in one direction (to the right as seen in FIG. 3).

In operation, stop screw 144 is adjusted so that when it is brought into contact with its stop surface (i.e. cap 142), the X axis of zero point Z is positioned under the axis of rotation R of the spindle. Further adjustment normally is necessary only to compensate for wear or accidental misuse of the machine.

The range of movement of the table relative to the saddle in the opposite direction (to the left as seen in FIG. 3), is limited by contact of a stop bar 148, fixed to side wall 106 of the table, with cap 142.

The range of forward movement of the saddle relative to the base is limited by contact of the forward wall of the saddle with a stop screw 150 threaded in an adjustable saddle stop 152 fixed to the forward wall 40 of base 10.

In operation, stop screw 150 is adjusted so that when it is brought into contact with its stop surface (i.e the forward wall of the saddle), the Y axis of zero point Z is positioned under the axis of rotation R of the spindle. Further adjustment normally is necessary only to compensate for wear or accidental misuse of the machine.

The range of rearward movement of the saddle relative to the base is limited by contact of the rearward wall of the saddle with column 14.

Means is provided for locking the table in its various positions of longitudinal adjustment relative to the saddle and comprises a table locking bar 154 (see FIGS. 3 and 5), disposed in a recess 156 provided in the lower surface of the table and a locking cam 158 eccentrically mounted upon the inner end of a shaft 160 rotatably supported in the table and actuable by a handle 162 fixed to its outermost free end.

Movement of handle 162 rotates shaft 160 to rotate cam 158 into and out of tight bearing contact with table locking bar 154, thereby moving the table locking bar into, or releasing it from tight bearing contact with key 136 which is fixed to the saddle, as aforesaid, thereby selectively locking the table against movement relative to the saddle or permitting such movement.

Saddle indicating means 170 is provided for indicating the amount of transverse front and rear travel of the saddle relative to the base and table indicating means 190 is provided for indicating the amount of longitudinal side-to-side travel of the table relative to the saddle.

The indicating means 170 and 190, which have been shown only in FIGS. 1 and 2 of the drawings, may be of any commercially available type, although those shown in the drawing are sold under the proprietary trademark Trav-A-Dial and are possessed of the desirable characteristics of low cost and sensitivity and a high degree of accuracy.

The indicating means are mounted on the saddle and the table respectively by brackets 172.

A contact bar 174 fixed to the base has bearing contact with a sensing portion 176 provided on saddle indicating means 170 whereby, as the saddle is moved relative to the base and contact bar, the amount of travel is indicated on a dial 178 of the indicating means.

A contact bar 180 fixed to the table has bearing contact with a sensing portion 182 provided on table indicating means 190 whereby, as the table is moved relative to the saddle, the amount of travel is indicated on a dial 184 of the indicating means.

The indicating means will be set so that when the adjustable stop screws 150 and 144 have been brought into contact with their respective stop surfaces, thereby positioning the X and Y axes of zero point Z of the table directly under the axis of rotation R of the spindle, the dials thereof will indicate zero. Mutually perpendicular movements of the table and saddle will thus be indicated on the dials of the indicating means. When the correct dial setting has been reached, the table and saddle may be locked in position, whereby a plurality of pieces can be center-drilled without necessity of laborious locating operations.

With workpieces of identical size, wherein it is desired to spot a hole therein, positive and identical positioning of the holes in each workpiece is assured.

In FIGS. 6–10 I have shown several methods for holding a workpiece upon the upper surface of table 12 for subsequent lay-out or spotting operations.

In FIG. 6, the magnetic chuck 92 holds a rectangular workpiece of magnetic material at the zero point, two sides of the workpiece bearing against the keys 116 in the grooves 94 and 96 in table 12.

In FIG. 7, a corner key 216 disposed in the grooves 94 and 96 of the table and a clamp 218 support tall thin stock at the zero point.

In FIG. 8, a workpiece of non-magnetic material is supported against the keys 116 at the zero point by a clamp 220 slidably engaged in a T-slot 222 provided in forward wall 102 of the table.

A similar T-slot 224 is provided in the table top and is disposed parallel to groove 96 (or the Y axis), as a further aid in clamping odd-shaped pieces.

In FIG. 9, a V-block 226 and clamp 228 support a cylindrical workpiece at the zero point.

In FIG. 10, the shaft of a universal chuck and index plate 230 is disposed in opening 112 in the table at the zero point for locating holes radially in a flat annular workpiece, by aligning the holes in the index plate with a reference hole in table and locking the index plate by means of an index pin 232.

In the "measuring" phase of machine use, if a part is placed in position on the table and if features of the part such as holes or edges are positioned under the axis of rotation R of the spindle by means of suitable indicators provided on the collet or chuck, the indicators 170 and 190 will indicate the distance of the part feature from the X and Y axes.

In the "layout" phase of machine use, a scribe is substituted for the center drill, the scribe being adapted to scribe lines in the workpiece responsive to movements of the table and saddle.

I claim:

1. A combination work laying out and spotting and measuring mechanism for use with a fixed base having a front and rear and opposite sides and a vertically-movable tool-carrying spindle fixed to the base and having an axis of rotation normal to the plane of the base comprising the combination of:
    a table-supporting saddle slideably mounted on the base for translatory movement in a horizontal plane relative thereto along an X axis extending from the front to the rear of the base,
    pinion and rack means for driving the saddle along the X axis with respect to the base,
    means for locking the saddle in desired adjustment position with respect to the base,
    a positionable magnetic-chuck-mounting work-holding table coextensive with and mounted upon the saddle for translatory movement in a horizontal plane relative thereto,
    gear means for guided movement of the table relative to the saddle and in a horizontal plane in directions between the two sides of the base and along a Y axis perpendicular to the directions of movement of the saddle with respect to the base,
    means for locking the table in desired positions of adjustment with respect to the saddle,
    mutually perpendicular key-receiving grooves in the table on two sides of the magnetic chuck with one groove extending along the X axis and the other groove extending along the Y axis and with the axes of the grooves defining a linear zero point Z of the table at their intersection,
    keys seated in the grooves and extending upwardly of the table for providing work-abutting edges for ready positioning of a corner of the work at the linear zero point Z of the table,
    adjustable stop means for accurately positioning the table with the linear zeor point thereof disposed vertically beneath the axis of rotation of the spindle,
    saddle movement indicating means for indicating the movement of the saddle relative to the base with respect to distance away from the linear zero point Z,
    table movement indicating means for indicating the movement of the table relative to the saddle with respect to distance away from the linear zero point Z.

2. In the combination work laying out and spotting and measuring mechanism according to claim 1, the table having T-slots therein, and clamp means engageable with the T-slots for holding a work on the table.

3. In the combination work laying out and spotting and measuring mechanism according to claim 1, including a V-block and clamp on the table for holding a cylindrical work on the table.

4. In the combination work laying out and spotting and measuring mechanism according to claim 1, including an opening in the table at the linear zero point Z for receiving the tool of the spindle therethrough, and an index plate adapted to hold a flat annular work relative to the table.

5. A combination work laying out and spotting and measuring mechanism for use with a fixed base having a front and rear and opposite sides and a vertically-movable tool-carrying spindle fixed to the base and having an axis of rotation normal to the plane of the base comprising the combination of:
    table-supporting saddle slideably mounted on the base for translatory movement in a horizontal plane relative thereto along an X axis extending from the front to the rear of the base,
    means for driving the saddle along the X axis with respect to the base,
    means for locking the saddle in desired adjustment position with respect to the base,
    a magnetic-chuck-mounting work-holding table coextensive with and mounted upon the saddle for translatory movement in a horizontal plane relative thereto, gear means for guided movement of the table relative to the saddle and in a horizontal plane in directions between the two sides of the base and along a Y axis perpendicular to the directions of movement of the saddle with respect to the base, means for locking the table in desired positions of adjustment with respect to the saddle, mutually perpendicular key-receiving grooves in the table on two sides of the magnetic chuck with one groove extending along the X axis and the other groove extending along the Y axis and with the axes of the grooves defining a linear zero point Z of the table at their intersection, keys seated in the grooves and extending upwardly of the table for providing work-abutting edges for ready positioning of a corner of the work at the linear zero point Z of the table, adjustable stop means for accurately positioning the table with the linear zero point thereof disposed vertically beneath the axis of rotation of the spindle, indicating means for indicating the respective movements of the saddle relative to the base with respect to distance away from the linear zero point Z and of the table relative to the saddle with respect to distance away from the linear zero point Z.

References Cited

UNITED STATES PATENTS

| | | | |
|---|---|---|---|
| 1,188,642 | 6/1916 | Forsberg | 33—189 |
| 1,323,267 | 12/1919 | Hanson | 33—174 |
| 2,209,498 | 7/1940 | Wittman | 33—189 |
| 2,471,067 | 5/1949 | Hitchcock | 33—174 |
| 2,601,330 | 6/1952 | Schmidt | 33—189 |
| 3,205,587 | 9/1965 | Kilburn | 33—189 |
| 3,229,373 | 1/1966 | Benton et al. | 33—174 |

FOREIGN PATENTS 343,751  2/1960  Switzerland.

WILLIAM D. MARTIN, Jr., *Primary Examiner.*

U.S. Cl. X.R.

33—1, 174